United States Patent
Qiu et al.

(10) Patent No.: US 10,521,469 B2
(45) Date of Patent: Dec. 31, 2019

(54) IMAGE RE-RANKING METHOD AND APPARATUS

(71) Applicant: Huawei Technologies Co., Ltd., Shenzhen (CN)

(72) Inventors: Shi Qiu, Hong Kong (CN); Xiaogang Wang, Hong Kong (CN); Wenqi Ju, Shenzhen (CN); Jianzhuang Liu, Shenzhen (CN); Xiaoou Tang, Hong Kong (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 887 days.

(21) Appl. No.: 15/094,675

(22) Filed: Apr. 8, 2016

(65) Prior Publication Data

US 2016/0224593 A1  Aug. 4, 2016

Related U.S. Application Data

(63) Continuation of application No. PCT/CN2014/075489, filed on Apr. 16, 2014.

(30) Foreign Application Priority Data

Oct. 11, 2013  (CN) .......................... 2013 1 0474547

(51) Int. Cl.
*G06F 16/583* (2019.01)
*G06F 16/28* (2019.01)
(Continued)

(52) U.S. Cl.
CPC ...... *G06F 16/583* (2019.01); *G06F 16/24578* (2019.01); *G06F 16/285* (2019.01); *G06F 16/9024* (2019.01); *G06N 20/00* (2019.01)

(58) Field of Classification Search
CPC .......... G06F 16/9024; G06F 16/24578; G06F 16/285; G06F 16/532; G06F 16/50;
(Continued)

(56) References Cited

U.S. PATENT DOCUMENTS 6,711,287 B1 * 3/2004 Iwasaki ................ G06K 9/4652
382/165
9,489,403 B2 * 11/2016 Eskolin .............. G06Q 30/0256
(Continued)

FOREIGN PATENT DOCUMENTS

| CN | 101075238 A | 11/2007 |
| CN | 103064903 A | 4/2013 |

(Continued)

OTHER PUBLICATIONS

Fergus et al., "Learning Object Categories from Google's Image Search," Proceedings of the Tenth IEEE International Conference on Computer Vision, Institute of Electrical and Electronics Engineers, New York, New York (Oct. 17-21, 2005).
(Continued)

*Primary Examiner* — Paulinho E Smith
(74) *Attorney, Agent, or Firm* — Leydig, Voit & Mayer, Ltd.

(57) ABSTRACT

The present disclosure relates to an image re-ranking method, which includes: performing image searching by using an initial keyword, obtaining, by calculation, an anchor concept set of a search result according to the search result corresponding to the initial keyword, obtaining, by calculation, a weight of a correlation between anchor concepts in the anchor concept set, and forming an anchor concept graph ACG by using the anchor concepts in the anchor concept set as vertexes and the weight of the correlation between anchor concepts as a weight of a side between the vertexes; acquiring a positive training sample
(Continued)

by using the anchor concepts, and training a classifier by using the positive training sample; obtaining a concept projection vector by using the ACG and the classifier; calculating an ACG distance between images in the search result corresponding to the initial keyword; and ranking the images according to the ACG distance.

20 Claims, 6 Drawing Sheets

(51) Int. Cl.
    *G06N 20/00*     (2019.01)
    *G06F 16/901*     (2019.01)
    *G06F 16/2457*     (2019.01)

(58) Field of Classification Search
CPC .. G06F 16/54; G06F 16/5846; G06F 16/5866; G06N 20/00; G06K 9/6215
See application file for complete search history.

(56) References Cited

U.S. PATENT DOCUMENTS

| | | | |
|---|---|---|---|
| 10,296,531 B2* | 5/2019 | Tang | G06F 16/54 |
| 2003/0016250 A1* | 1/2003 | Chang | G06F 16/532 715/810 |
| 2007/0271296 A1 | 11/2007 | Purang et al. | |
| 2011/0010319 A1* | 1/2011 | Harada | G06K 9/00664 706/12 |
| 2012/0113109 A1* | 5/2012 | Lee | G06T 17/00 345/419 |
| 2012/0254076 A1 | 10/2012 | Yang et al. | |
| 2013/0060766 A1 | 3/2013 | Lin et al. | |
| 2013/0080426 A1 | 3/2013 | Chen et al. | |
| 2013/0108177 A1* | 5/2013 | Sukthankar | G06K 9/68 382/218 |
| 2013/0198174 A1 | 8/2013 | Poznanski et al. | |
| 2016/0224593 A1* | 8/2016 | Qiu | G06N 20/00 |
| 2017/0004383 A1* | 1/2017 | Lin | G06F 16/5866 |

FOREIGN PATENT DOCUMENTS

| | | | | |
|---|---|---|---|---|
| CN | 104572651 A | * | 4/2015 | G06N 20/00 |
| JP | 2010211484 A | | 9/2010 | |
| WO | WO 2013075272 A1 | | 5/2013 | |

OTHER PUBLICATIONS

Fritz et al., "Decomposition, Discovery and Detection of Visual Categories Using Topic Models," IEEE Conference on Computer vision and Pattern Recognition, pp. 1-8, Institute of Electrical and Electronics Engineers, New York, New York (Jun. 23-28, 2008).

Goodrum, "Image Information Retrieval: An Overview of Current Research," Informing Science, vol. 3, No. 2, pp. 63-67 (2000).

Jing et al., "VisualRank: Applying PageRank to Large-Scale Image Search," IEEE Transactions on Pattern Analysis and Machine Intelligence, vol. 30, No. 11, pp. 1877-1890, Institute of Electrical and Electronics Engineers, New York, New York (Nov. 2008).

Krapac et al., "Improving web-image search results using query-relative classifiers," IEEE Conference on Computer Vision and Pattern Recognition, pp. 1094-1101, San Francisco, United States, Institute of Electrical and Electronics Engineers, New York, New York (Jun. 13-18, 2010).

Liu et al, "Noise Resistant Graph Ranking for Improved Web Image Search," CVPR 2011, pp. 849-865, Institute of Electrical and Electronics Engineers, New York, New York (Jun. 20-25, 2011).

Mezaris et al., "A Test-Bed for Region-Based Image Retrieval Using Multiple Segmentation Algorithms and the MPEG-7 eXperimentation Model: The Schema Reference System," CIVR 2004, LNCS 3115, pp. 592-600 (2004).

Morioka et al., "Robust Visual Reranking via Sparsity and Ranking Constraints," 19th International Conference on Multimedia, Scottsdale, Arizona, ACM Multimedia (Nov. 28-Dec. 1, 2011).

Schroff et al., "Harvesting Image Databases from the Web," IEEE 11th International Conference on Computer Vision, pp. 1-8, Institute of Electrical and Electronics Engineers, New York, New York (Oct. 14-21, 2007).

Tian et al., "Bayesian Visual Reranking," IEEE Transactions on Multimedia, vol. 13, No. 4, pp. 639-652, Institute of Electrical and Electronics Engineers, New York, New York (Aug. 2011).

Wu et al., "Probability Estimates for Multi-class Classification by Pairwise Coupling," Journal of Machine Learning Research, vol. 5, pp. 975-1105 (Aug. 2004).

Yan et al., "Co-retrieval: a boosted reranking approach for video retrieval," IEE Proceedings-Visual, Image, and Signal Processing, vol. 152, No. 6, pp. 888-895, Institute of Electrical and Electronics Engineers, New York, New York (Dec. 2005).

Yan et al., "Multimedia Search with Pseudo-Relevance Feedback," Research Showcase at CMU, Carnegie Mellon University Computer Science Department, Pittsburg, PA (Mar. 2003).

Yikhar, "Content-Based Image Retrieval (CBIR): State-of-the-Art and Future Scope for Research," IUP Journal of Information Technology, vol. 6, Issue 2, pp. 64-84, Abstract (Jun. 2010).

* cited by examiner

IMAGE RE-RANKING METHOD AND APPARATUS

CROSS-REFERENCE TO RELATED APPLICATIONS

This application is a continuation of International Patent Application No. PCT/CN2014/075489, filed on Apr. 16, 2014, which claims priority to Chinese Patent Application No. 201310474547.0, filed on Oct. 11, 2013, both of which are hereby incorporated by reference in their entireties.

TECHNICAL FIELD

The present disclosure relates to the field of computer technologies, and in particular, to an image re-ranking method and apparatus.

BACKGROUND

With rapid development of Internet technologies, network image data increases rapidly at an amazing speed. When wanting to use such massive data resources, a common Internet user needs to retrieve images. When an image is retrieved by using a keyword, generally many images that are somehow associated with the keyword are obtained, but many images that have little or no association with a result needed by a user may also be obtained simultaneously.

In recent years, search engine operators represented by Google, Bing, and Baidu all offer an image search function, which provides a service for a common user to retrieve massive network image data. At present, there are two image retrieval manners: image retrieval using a keyword, and content based image retrieval (CBIR). The image retrieval using a keyword is the most popular manner at present, and can use image tag information that is based on a user input to perform accurate image semantic matching. However, a search result usually includes many images that do not satisfy a demand of a user, which is caused by reasons such as an inaccurate or unprofessional word used in searching by a common user and much content contained in text of an article that matches an image. The CBIR is a research focus in the field of computer vision and information retrieval in recent years, and a research objective is to perform effective retrieval by using visual information of an image itself (searching an image by using an image). However, due to diversity of visual information of the image itself and existence of "semantic gap", a retrieval effect of CBIR still does not meet a requirement of actual use.

In conclusion, a current image retrieval manner cannot bring a satisfactory effect to a user, and it becomes an important demand that obtained images are re-organized and re-ranked according to specific information provided by the user, so that the user can spend fewer efforts viewing more images that satisfy a requirement.

SUMMARY

The present disclosure provides an image re-ranking method and apparatus, so that ranking of an image search result is more accurate and better satisfies a search intention of a user.

A first aspect of the present disclosure provides an image re-ranking method, where the method includes:
performing image searching by using an initial keyword; obtaining, by calculation, an anchor concept set of a search result according to the search result corresponding to the initial keyword; obtaining, by calculation, a weight of a correlation between anchor concepts in the anchor concept set; and forming an anchor concept graph Anchor Concept Graph ACG by using the anchor concepts in the anchor concept set as vertexes and a line between the vertexes as a side of the vertexes, where the side of the vertexes has the weight of the correlation between the anchor concepts, and the weight of the correlation between the anchor concepts represents a value of a semantic correlation between the anchor concepts;

acquiring a positive training sample by using the anchor concepts, and training a classifier by using the positive training sample, to obtain a trained classifier; and performing concept projection by using the ACG and the trained classifier, to obtain a concept projection vector; calculating, according to the concept projection vector, an ACG distance between images in the search result corresponding to the initial keyword; and ranking, according to the ACG distance, the images in the search result corresponding to the initial keyword.

With reference to the first aspect, in a first possible implementation manner of the first aspect, the obtaining, by calculation, an anchor concept set according to the search result corresponding to the initial keyword includes:

performing image searching by using an initial keyword q, to obtain a search result, where the search result includes an image set $\Gamma_q$ corresponding to the initial keyword q, and a text set $T_q$ that surrounds an image in the image set $\Gamma_q$;

extracting a visual feature of each image in the image set $\Gamma_q$;

for an image $I_k$ in the image set $\Gamma_q$, forming a similar image set $N(I_k)$ of the image $I_k$ by using K images whose visual features are most similar to that of the image $I_k$, and using T words that occur most frequently in text that surrounds all images in the similar image set $N(I_k)$ as candidate words, to obtain a candidate word set $W_{I_k}$ of a meaning of the image $I_k$, that is, $W_{I_K}=\{\omega_{I_k}^i\}_{i=1}^T$, where $I_k$ represents the $k^{th}$ image in the image set $\Gamma_q$, k=1, 2, 3, ..., N6, N6 is a quantity of images in the image set $\Gamma_q$, $\omega_{I_k}^i$ represents the $i^{th}$ candidate word of the image $I_k$, i=1, 2, 3, ..., T, and T is a preset positive integer;

performing weight calculation on each candidate word $\omega_{I_k}^i$ in the candidate word set $W_{I_k}$ to obtain a weight $r_f(\omega_{I_k}^i)$ of the candidate word $\omega_{I_k}^i$; and separately combining $M_q$ candidate words whose weights $r_f(\omega_{I_k}^i)$ are the largest in the candidate word set $W_{I_k}$ with the initial keyword q, to obtain $M_q$ anchor concepts and form an anchor concept set $C_q$, where $M_q$ is a quantity of elements in the anchor concept set $C_q$ corresponding to the preset initial keyword q.

With reference to the first possible implementation manner of the first aspect, in a second possible implementation manner of the first aspect, the performing weight calculation on each candidate word $\omega_{I_k}^i$ in the candidate word set $W_{I_k}$ to obtain a weight $r_f(\omega_{I_k}^i)$ of the candidate word $\omega_{I_k}^i$ includes:

calculating the weight $r_f(\omega_{I_k}^i)$ of the candidate word $\omega_{I_k}^i$ according to a value of an occurrence frequency of the candidate word $\omega_{I_k}^i$, where a higher occurrence frequency of the candidate word $\omega_{I_k}^i$ indicates a larger weight $r_f(\omega_{I_k}^i)$.

With reference to the first aspect or the first or the second possible implementation manner of the first aspect, in a third possible implementation manner of the first aspect, the obtaining, by calculation, a weight of a correlation between anchor concepts in the anchor concept set includes:

counting words that are on a web page and occur in a same document with the anchor concepts, finding out, from the words, the top N1 words that can most represent semantics of the anchor concepts, assigning a weight to the top N1 words according to a preset value assignment method, and forming, by using the weight of the top N1 words, vectors corresponding to the anchor concepts, where N1 is a preset positive integer; and calculating a degree of similarity between vectors corresponding to any two of the anchor concepts, and using the degree of similarity as a weight of a correlation between the two corresponding anchor concepts.

With reference to the first aspect, in a fourth possible implementation manner of the first aspect, the acquiring a positive training sample by using the anchor concepts, and training a classifier by using the positive training sample, to obtain a trained classifier includes:

performing image searching or statistics collection by using the anchor concepts as keywords, to obtain search result sets of the anchor concepts; and selecting the top N2 images in a search result set corresponding to the anchor concept $a_i$ as a positive sample set corresponding to the anchor concept $a_i$, where N2 is a preset integer, and i=1, 2, 3, . . . , $M_q$;

extracting visual features of the N2 images in the positive sample set corresponding to the anchor concept $a_i$, and using the visual features as a feature set of positive samples that is corresponding to the anchor concepts, where N2 is a preset integer, and i=1, 2, 3, . . . , $M_q$; and training the classifier by using the feature set of the positive samples that is corresponding to the anchor concepts, to obtain the trained classifier.

With reference to the first aspect, in a fifth possible implementation manner of the first aspect, the performing concept projection by using the ACG and the classifier, to obtain a concept projection vector, and calculating, according to the concept projection vector, an ACG distance between images in the search result corresponding to the initial keyword includes:

extracting a visual feature of an image in the search result corresponding to the initial keyword, calculating, by using the ACG and the trained classifier, a probability that the extracted visual feature belongs to a category to which each of the anchor concepts belongs, and using the probability as an initial concept projection vector of an image corresponding to the concept projection; and calculating the ACG distance between the images according to the initial concept projection vector.

With reference to the fifth possible implementation manner of the first aspect, in a sixth possible implementation manner of the first aspect, the calculating the ACG distance between the images according to the initial concept projection vector includes:

performing, by using a formula $$p_i^* = \sum_{n=0}^{\infty} (\alpha^n \overline{W} p_i) = (I - \alpha \overline{W})^{-1} p_i,$$

smoothing processing on the image initial concept projection vector $p_i$ of an image corresponding to the initial keyword, where $p_i$ represents an initial concept projection vector of the $i^{th}$ image corresponding to the initial keyword, $p^*_i$ represents the $i^{th}$ concept projection vector after smoothing, $\alpha$ represents a damping factor that controls a diffusion rate, $\overline{W}$ represents a column-normalized correlation matrix, $\overline{W}=WD^{-1}$, D is a diagonal matrix of a diagonal element $D_{ii}=\Sigma_{j=1}^{M_q} W_{ji}$, and $M_q$ is the quantity of the elements in the anchor concept set $C_q$ corresponding to the preset initial keyword q; and calculating an ACG distance $dist^{ACG}$ between the $i^{th}$ image and the $j^{th}$ image by using a formula $dist^{ACG}=\|p^*_i - p^*_j\|_1 = \|(I-\alpha\overline{W})^{-1}(p_i-p_j)\|_1$.

With reference to the first aspect or any one of the first to the sixth possible implementation manners of the first aspect, in a seventh possible implementation manner of the first aspect, after re-ranking is performed, according to the ACG distance, on the images in the search result corresponding to the initial keyword, the method further includes:

displaying a re-ranking result of the images in an image logic organizing manner of having a similar vision and similar semantic information.

With reference to the seventh possible implementation manner of the first aspect, in an eighth possible implementation manner of the first aspect, the image logic organizing manner of having a similar vision and similar semantic information includes:

displaying together, by using a frame, images that are in the images and belong to a same category to which the anchor concepts belong; or displaying, according to a difference between distance values, images that are in the images and belong to different categories to which the anchor concepts belong; or displaying, by using a hierarchical recursive structure, each type of images that are in the images and belong to a same category to which the anchor concepts belong; or displaying, in a thumbnail cascading manner, images that are in the images and belong to a same category to which the anchor concepts belong; or annotating, in a text form, the anchor concepts at a periphery of images that are in the images and belong to a same category to which the anchor concepts belong; or representing, in a form of a number or a bar length at a periphery of images that are in the images and belong to a same category to which the anchor concepts belong, a value of a correlation between the images and the category to which the anchor concepts belong, where a larger number or a longer bar represents a higher correlation.

With reference to the eighth possible implementation manner of the first aspect, in a ninth possible implementation manner of the first aspect, when the images that are in the images and belong to the same category to which the anchor concepts belong are displayed in the thumbnail cascading manner, when an area of the category to which the anchor concepts belong is selected, images that are in the selected area and are of the category to which the anchor concepts belong are displayed uppermost on a display screen, so that a user views all images of the category.

According to a second aspect, the present disclosure further provides an image re-ranking apparatus, where the apparatus includes:

a graph establishing module, configured to: perform image searching by using an initial keyword; obtain, by calculation, an anchor concept set of a search result according to the search result corresponding to the initial keyword; obtain, by calculation, a weight of a correlation between anchor concepts in the anchor concept set; and form an anchor concept graph Anchor Concept Graph ACG by using the anchor concepts in the anchor concept set as vertexes and a line between the vertexes as a side of the vertexes, where the side of the vertexes has the weight of the correlation between the anchor concepts, and the weight of the correlation between the anchor concepts represents a value of a semantic correlation between the anchor concepts;

a training module, configured to acquire a positive training sample by using the anchor concepts obtained by the graph establishing module, and train a classifier by using the positive sample, to obtain a trained classifier; and a ranking module, configured to: perform concept projection by using the ACG formed by the graph establishing module and the trained classifier obtained by the training module, to obtain a concept projection vector; calculate, according to the concept projection vector, an ACG distance between images in the search result corresponding to the initial keyword; and rank, according to the ACG distance, the images in the search result corresponding to the initial keyword.

With reference to the second aspect, in a first possible implementation manner of the second aspect, the graph establishing module includes:

a first searching unit, configured to perform image searching by using an initial keyword q, to obtain a search result, where the search result includes an image set $\Gamma_q$ corresponding to the initial keyword q, and a text set $T_q$ that surrounds an image in the image set $\Gamma_q$;

a first extracting unit, configured to: extract a visual feature of each image in the image set $\Gamma_q$ obtained by the first searching unit; for an image $I_k$ in the image set $\Gamma_q$, form a similar image set $N(I_k)$ of the image $I_k$ by using K images whose visual features are most similar to that of the image $I_k$; and use T words that occur most frequently in text that surrounds all images in the similar image set $N(I_k)$ as candidate words, to obtain a candidate word set $W_{I_k}$ of a meaning of the image $I_k$, that is, $W_{I_k}=\{\omega_{I_k}^i\}_{i=1}^T$, where $I_k$ represents the $k^{th}$ image in the image set $\Gamma_q$, k=1, 2, 3, ..., N6, N6 is a quantity of images in the image set $\Gamma_q$, $\omega_{I_k}^i$ represents the $i^{th}$ candidate word of the image $I_k$, i=1, 2, 3, ..., T, and T is a preset positive integer;

a weight calculating unit, configured to perform weight calculation on each candidate word $\omega_{I_k}^i$ in the candidate word set $W_{I_k}$ obtained by the first extracting unit, to obtain a weight $r_f(\omega_{I_k}^i)$ of the candidate word $\omega_{I_k}^i$; and a combining unit, configured to separately combine, according to a calculation result of the weight calculating unit, $M_q$ candidate words whose weights $r_f(\omega_{I_k}^i)$ are the largest in the candidate word set $W_{I_k}$ with the initial keyword q, to obtain $M_q$ anchor concepts and form an anchor concept set $C_q$, where $M_q$ is a quantity of elements in the anchor concept set $C_q$ corresponding to the preset initial keyword q.

With reference to the first possible implementation manner of the second aspect, in a second possible implementation manner of the second aspect, the weight calculating unit calculates the weight $r_f(\omega_{I_k}^i)$ of the candidate word $\omega_{I_k}^i$ according to an occurrence frequency of the candidate word $\omega_{I_k}^i$, where a higher occurrence frequency of the candidate word $\omega_{I_k}^i$ indicates a larger weight $r_f(\omega_{I_k}^i)$.

With reference to the second aspect or the first or the second possible implementation manner of the second aspect, in a third possible implementation manner of the second aspect, the graph establishing module further includes:

a counting unit, configured to count words that are on a web page and occur in a same document with the anchor concepts, find out, from the words, the top N1 words that can most represent semantics of the anchor concepts, assign a weight to the top N1 words according to a preset value assignment method, and form, by using the weight of the top N1 words, vectors corresponding to the anchor concepts, where N1 is a preset positive integer; and a correlation calculating unit, configured to calculate a degree of similarity between vectors corresponding to any two of the anchor concepts, and use the degree of similarity as a weight of a correlation between the two corresponding anchor concepts.

With reference to the second aspect, in a fourth possible implementation manner of the second aspect, the training module includes:

a second searching unit, configured to perform image searching by using the anchor concepts as keywords, to obtain search result sets of the anchor concepts, and select the top N2 images in a search result set corresponding to the anchor concept $a_i$ as a positive sample set corresponding to the anchor concept $a_i$, where N2 is a preset integer, and i=1, 2, 3, ..., $M_q$;

a second extracting unit, configured to extract visual features of the N2 images in the positive sample set corresponding to the anchor concept $a_i$, and use the visual features as a feature set of positive samples that is corresponding to the anchor concepts, where N2 is a preset integer, and i=1, 2, 3, ..., $M_q$; and a training unit, configured to train the classifier by using the feature set of the positive samples that is corresponding to the anchor concepts, to obtain the trained classifier.

With reference to the second aspect, in a fifth possible implementation manner of the second aspect, the ranking module includes:

a third extracting unit, configured to: by using the ACG formed by the graph establishing module and the trained classifier obtained by the training module, extract a visual feature of an image in the search result corresponding to the initial keyword, calculate, by using the classifier, a probability that the extracted visual feature belongs to a category to which each of the anchor concepts belongs, and use the probability as an initial concept projection vector of an image corresponding to the concept projection; and a distance calculating unit, configured to calculate, according to the initial concept projection vector, obtained by the third extracting unit, the ACG distance between the images in the search result corresponding to the initial keyword.

With reference to the fifth possible implementation manner of the second aspect, in a sixth possible implementation manner of the second aspect, the distance calculating unit includes:

a first calculating subunit, configured to perform, by using a formula $$p_i^* = \sum_{n=0}^{\infty} (\alpha^n \overline{W} p_i) = (I - \alpha\overline{W})^{-1} p_i,$$

smoothing processing on an initial concept projection vector $p_i$ of the image, where $p_i$ represents an initial concept projection vector of the $i^{th}$ image, $p^*_i$ represents the $i^{th}$ concept projection vector corresponding to the initial keyword q after smoothing, $\alpha$ represents a damping factor that controls a diffusion rate, $\overline{W}$ represents a column-normalized correlation matrix, $\overline{W}=WD^{-1}$, D is a diagonal matrix of a diagonal element $D_{ii}=\Sigma_{j=1}^{M_q} W_{ji}$, and $M_q$ is the quantity of the elements in the anchor concept set $C_q$ corresponding to the preset initial keyword q; and a second calculating subunit, configured to calculate an ACG distance $dist^{ACG}$ between the $i^{th}$ image and the $j^{th}$ image by using a formula $dist^{ACG}=\|p^*_i-p^*_j\|_1=\|(I-\alpha \overline{W})^{-1}(p_i-p_j)\|_1$.

With reference to the second aspect or any one of the first to the sixth possible implementation manners of the second aspect, in a seventh possible implementation manner of the second aspect, the apparatus further includes:

a displaying module, configured to display, in an image logic organizing manner of having a similar vision and similar semantic information, a re-ranking result of the images that is obtained by the ranking module.

With reference to the seventh possible implementation manner of the second aspect, in an eighth possible implementation manner of the second aspect, the image logic organizing manner of having a similar vision and similar semantic information includes:

displaying together, by using a frame, images that are in the images and belong to a same category to which the anchor concepts belong; or displaying, according to a difference between distance values, images that are in the images and belong to different categories to which the anchor concepts belong; or displaying, by using a hierarchical recursive structure, each type of images that are in the images and belong to a same category to which the anchor concepts belong; or displaying, in a thumbnail cascading manner, images that are in the images and belong to a same category to which the anchor concepts belong; or annotating, in a text form, the anchor concepts at a periphery of images that are in the images and belong to a same category to which the anchor concepts belong; or representing, in a form of a number or a bar length at a periphery of images that are in the images and belong to a same category to which the anchor concepts belong, a value of a correlation between the images and the category to which the anchor concepts belong, where a larger number or a longer bar represents a higher correlation.

With reference to the eighth possible implementation manner of the second aspect, in a ninth possible implementation manner of the second aspect, when the images that are in the images and belong to the same category to which the anchor concepts belong are displayed in the thumbnail cascading manner, when an area of the category to which the anchor concepts belong is selected, the displaying module displays uppermost on a display screen images that are in the selected area and are of the category to which the anchor concepts belong, so that a user views all images of the category.

According to the image re-ranking method and apparatus provided in the present disclosure, visual feature information of an image is extracted to obtain a high-level text semantic concept (that is, anchor concept), an anchor concept graph ACG is established, and an ACG distance that is related to the high-level text semantic concept is obtained by calculation and is used as a measurement scale of re-ranking, so that ranking of an image search result is more accurate and better satisfies a search intention of a user.

BRIEF DESCRIPTION OF DRAWINGS

FIG. 2b is a schematic diagram of an anchor concept generated from FIG. 2a;

FIG. 2c is a schematic diagram of an anchor concept graph ACG established from FIG. 2a;

DESCRIPTION OF EMBODIMENTS

The following further describes the technical solutions of the present disclosure in detail with reference to accompanying drawings and embodiments.

An image re-ranking method and apparatus provided in the present disclosure are applicable to a scenario in which image searching or ranking is needed, and in particular, to a scenario in which image searching is performed by using a search engine. Re-ranking is performed on an image search result, so that a user can find a needed image by performing a few operations, and a ranking result better satisfies a search intention of the user.

Embodiment 1

Figure 1:
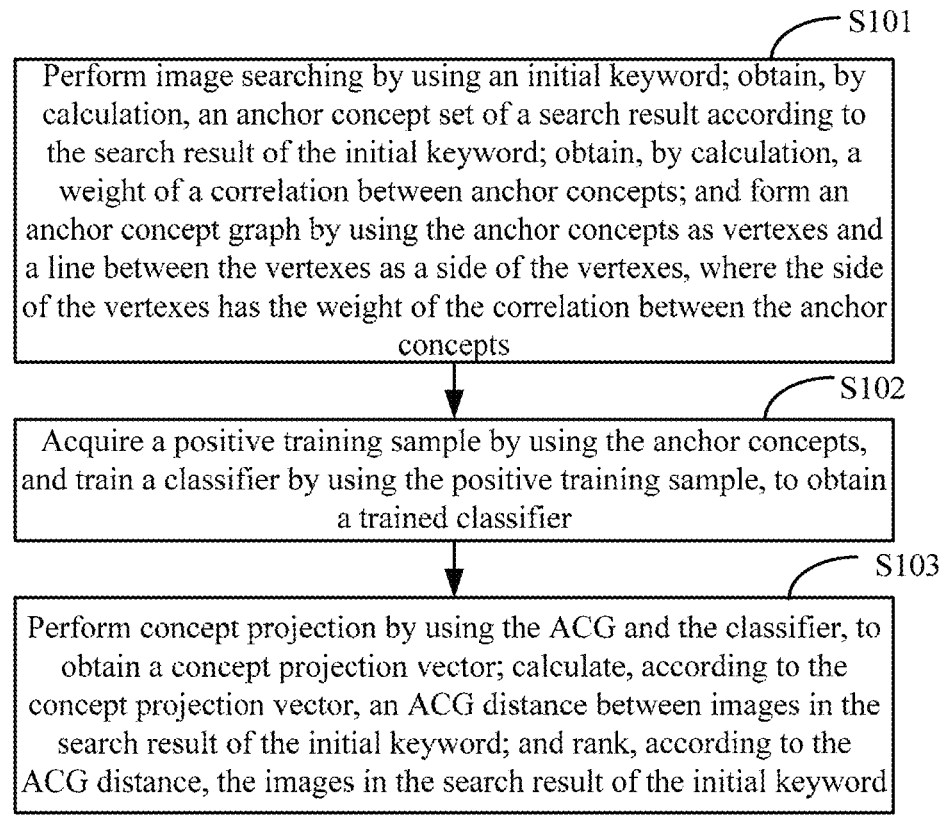
FIG. 1 is a flowchart of an image re-ranking method according to Embodiment 1 of the present disclosure.

FIG. 1 is a flowchart of an image re-ranking method provided in this embodiment. As shown in FIG. 1, the image re-ranking method of the present disclosure includes:

S101. Perform image searching by using an initial keyword; obtain, by calculation, an anchor concept set of a search result according to the search result corresponding to the initial keyword; obtain, by calculation, a weight of a correlation between anchor concepts in the anchor concept set; and form an anchor concept graph (Anchor Concept Graph, ACG) by using the anchor concepts in the anchor concept set as vertexes and a line between the vertexes as a side of the vertexes, where the side of the vertexes has the weight of the correlation between the anchor concepts.

In an anchor (Anchor) link, a text keyword is generally used as a link that points to another web page. The anchor link establishes a relationship between the text keyword and a uniform resource locator (Uniform Resource Locator, URL) link. An anchor is the text keyword. Generally, the anchor can accurately describe content of the pointed page. A concept of an anchor in the present disclosure is text that can most convey these images and is obtained by selecting from a text keyword (that is, an anchor) corresponding to an image in an image search result corresponding to the initial keyword.

The obtaining, by calculation, an anchor concept set according to a search result corresponding to the initial keyword includes the following steps:

S1011. Perform image searching by using an initial keyword q, to obtain a search result, where the search result includes an image set $\Gamma_q$ corresponding to the initial keyword q, and a text set $\Gamma_q$ that surrounds an image in the image set $\Gamma_q$.

A related image obtained by searching with the help of a search engine and by using the initial keyword q input by a user is used as a search result.

S1012. Extract a visual feature of each image in the image set $\Gamma_q$.

The visual feature may be a feature such as a color, a shape, a texture, or a spatial relationship of an image.

S1013. For an image $I_k$ in the image set $\Gamma_q$, form a similar image set $N(I_k)$ of the image $I_k$ by using K images whose visual features are most similar to that of the image $I_k$, and use T words that occur most frequently in text that surrounds all images in the similar image set $N(I_k)$ as candidate words, to obtain a candidate word set $W_{I_k}$ of a meaning of the image $I_k$, that is, $W_{I_k} = \{\omega_{I_k}^i\}_{i=1}^T$.

In the formula, $I_k$ represents the $k^{th}$ image in the similar image set $\Gamma_q$, k=1, 2, . . . , N6, N6 is a quantity of images in the image set $\Gamma_q$, $\omega_{I_k}$ represents the $i^{th}$ candidate word of the $k^{th}$ image $I_k$, i=1, 2, 3, . . . , T, and T is a preset positive integer.

S1014. Perform weight calculation on each candidate word $\omega_{I_k}^i$ in the candidate word set $W_{I_k}$ to obtain a weight $r_f(\omega_{I_k}^i)$ of the candidate word $\omega_{I_k}^i$.

The weight $r_f(\omega_{I_k}^i)$ of the candidate word $\omega_{I_k}^i$ is calculated according to a value of an occurrence frequency of the candidate word $\omega_{I_k}^i$. A higher occurrence frequency of the candidate word $\omega_{I_k}^i$ indicates a larger weight $r_f(\omega_{I_k}^i)$. For example, after candidate words in the candidate word set are ranked in descending order of occurrence frequency (for example, $\omega_{I_k}^1$ represents a word whose occurrence frequency is the highest, $\omega_{I_k}^2$ represents a word whose occurrence frequency is the second highest . . . ), and a weight of the candidate word $\omega_{I_k}^i$ is by using formula $r_f(\omega_{I_k}^i) = r_f(\omega_{I_k}^i) + (T-i)$, where $r_f(\omega_{I_k}^i)$ represents the weight of the candidate word $\omega_{I_k}^i$, i represents an order of the candidate word $\omega_{I_k}^i$ in the candidate word set $W_{I_k}$. For example, if a candidate word set has five candidate words, that is, T=5, a weight of a candidate word $\omega_{I_k}^1$ whose occurrence frequency is the highest is $r_f(\omega_{I_k}^1) = r_f(\omega_{I_k}^1) + (T-1) = 4$, and by analogy, a weight of a candidate word $\omega_{I_k}^2$ whose occurrence frequency is the second highest is 3, and a weight of a candidate word whose occurrence frequency is the third highest is 2. Certainly, a term frequency of a candidate word $\omega_{I_k}^i$ after normalization may also be directly used as a weight of the candidate word $\omega_{I_k}^i$, or another weight calculation method may be used.

S1015. Separately combine $M_q$ candidate words whose weights $r_f(\omega_{I_k}^i)$ are the largest in the candidate word set $W_{I_k}$ with the initial keyword q, to obtain $M_q$ anchor concepts and form an anchor concept set $C_q$, where $M_q$ is a quantity of elements in the anchor concept set $C_q$ corresponding to the preset initial keyword q.

The weight of the correlation between the anchor concepts represents a value of a semantic correlation between the anchor concepts.

The obtaining, by calculation, a weight of a correlation between anchor concepts in the anchor concept set includes the following steps:

S1016. Count words that are on a web page and occur in a same document with the anchor concepts, find out, from the words, the top N1 words that can most represent semantics of the anchor concepts, assign a weight to the top N1 words according to a preset value assignment method, and form, by using the weight of the top N1 words, vectors corresponding to the anchor concepts, where N1 is a preset positive integer.

Optionally, a manner of directly using each anchor concept al to obtain, by searching on a search engine, the top N3 document summaries corresponding to al and counting the most important N1 words in the top N3 document summaries may be used to calculate a vector corresponding to each anchor concept al. A manner of using an anchor concept as a keyword to search a web page on a search engine, or a manner of directly collecting statistics about web page data may also be used, text or a text summary that occurs in a same article as the anchor concept is obtained, the top N4 summaries are combined into one article, a statistics collection method, such as term frequency-inversed document frequency (tf-idf), is used to obtain a vector of the combined article, and then processing such as normalization is performed on the vector to obtain a final vector corresponding to the anchor concept. Then, a degree of similarity between final vectors corresponding to the anchor concepts is calculated, and is used as a weight of a correlation between two corresponding anchor concepts, where N1, N3, and N4 are preset positive integers. A more detailed discussion about anchor concept calculation can be found in an article [M. Sahami and T. D. Heilami. A web-based kernel function for measuring the similarity of short text snippets. In WWW, 2006] and a bibliography of the article.

S1017. Calculate a degree of similarity between vectors corresponding to any two of the anchor concepts, and use the degree of similarity as a weight of a correlation between the two corresponding anchor concepts.

Optionally, a cosine distance, a Euclidean distance, or the like of vectors corresponding to any two anchor concepts $C_i$ and $C_j$ may be calculated and used as a degree of similarity between the two vectors, that is, a weight of a correlation between the anchor concepts.

S1015 and S1016 are repeated until calculation of weights of correlations between all anchor concepts is completed. The degree of similarity or the weight of the correlation between the anchor concepts $C_i$ and $C_j$ is represented by using $W_{ij}$, and $W_{ij}$ is used as an element in the $i^{th}$ row and the $j^{th}$ column of a matrix W. When $W_{ii}$ (i=1, 2, . . . , $M_q$) is set to 1, the correlation matrix W of an anchor concept of an anchor concept graph ACG can be obtained.

In this way, an anchor concept graph ACG is formed by using the anchor concepts as vertexes and the weight of the correlation between the anchor concepts as a weight of a side.

S102. Acquire a positive training sample by using the anchor concepts, and train a classifier by using the positive training sample, to obtain a trained classifier. S102 includes the following steps:

S1021. Perform image searching or statistics collection by using the anchor concepts as keywords, which may be completed by using an existing search engine or by independently collecting statistics about images on a web page, to obtain search result sets of the anchor concepts (that is, a result obtained by performing searching or statistics collection by using the anchor concepts); and select the top N2 images in a search result set corresponding to the anchor concept $a_i$ as a positive sample set of the anchor concept $a_i$, where N2 is a preset integer, and i=1, 2, 3, . . . , $M_q$.

The positive training sample is a to-be-tested sample that includes a to-be-tested feature. For example, when face detection is performed, the positive training sample is a to-be-tested sample that includes a facial feature. In this embodiment of the present disclosure, the positive training sample is an image related to an anchor concept (a keyword).

S1022. Extract visual features of the N2 images in the positive sample set corresponding to the anchor concept $a_i$, and use the visual features as a feature set of positive samples that is corresponding to the anchor concepts.

S1023. Train the classifier by using the positive samples corresponding to the anchor concepts, to obtain the trained classifier.

Optionally, an existing multi-class support vector machine (Multi-class Support Vector Machine, Multi-class SVM) or the like is used as a classifier.

S103. Perform concept projection by using the ACG and the classifier, to obtain a concept projection vector; calculate, by using the concept projection vector, an ACG distance between images in the search result corresponding to the initial keyword; and rank, according to the ACG distance, the images in the search result corresponding to the initial keyword.

Concept projection is a process of obtaining, by using an established ACG and the trained classifier and by means of a series of computation, a vector (concept projection vector) that includes a value of a correlation between a set of a to-be-ranked image and an anchor concept in each ACG.

The calculating, by using the ACG and the trained classifier, a distance between images in the search result corresponding to the initial keyword includes the following steps:

S1031. Extract a visual feature of an image in the search result corresponding to the initial keyword; calculate, by using the ACG and the classifier, a probability that the extracted visual feature belongs to a category to which each of the anchor concepts belongs; and use the probability as an initial concept projection vector $p_i$ of an image $I_i$ corresponding to the concept projection.

S1032. Calculate, according to the initial concept projection vector, the ACG distance between the images in the search result corresponding to the initial keyword.

S10321. Perform, by using a formula $$p_i^* = \sum_{n=0}^{\infty} (\alpha^n \overline{W} p_i) = (I - \alpha \overline{W})^{-1} p_i,$$

smoothing processing on an initial concept projection vector $p_i$ of the image $I_i$ ($i=1, 2, \ldots, M_q$) corresponding to the initial keyword q.

In the formula, $p_i$ represents an initial concept projection vector of the $i^{th}$ image corresponding to the initial keyword q, $p^*_i$ represents the $i^{th}$ concept projection vector after smoothing, a represents a damping factor that controls a diffusion rate, $\overline{W}$ represents a column-normalized correlation matrix, $\overline{W}=WD^{-1}$, D is a diagonal matrix of a diagonal element $D_{ii}=\Sigma_{j=1}^{M_q} W_{ji}$, and $M_q$ is the quantity of the elements in the anchor concept set $C_q$ corresponding to the preset initial keyword q.

Smoothing processing is readjusting values of components of the initial concept projection vector $p_i$ of an image according to a correlation relationship between the components of the initial concept projection vector $p_i$, so that in a projection vector corresponding to an image, a value of a component of a category corresponding to a more similar visual feature is larger. A result of the smoothing processing enables final ACG distance calculation to be capable of more accurately differentiating between categories of images in high-level semantics.

S10322. Calculate an ACG distance $dist^{ACG}$ between the $i^{th}$ image and the $j^{th}$ image by using a formula $dist^{ACG}=\|p^*_i-p^*_j\|_1=\|(I-\alpha\overline{W})^{-1}(p_i-p_j)\|_1$.

After the ACG distance is obtained, score values of images for re-ranking are calculated according to the ACG distance, and the images are ranked according to the score values for re-ranking.

Optionally, a distance between any two images in an initial search result is calculated by using the ACG distance, thereby obtaining a similarity degree matrix K of the images, and an element $k_{ij}$ of the matrix K represents the $i^{th}$ image and the $j^{th}$ image in the search result corresponding to the initial keyword. Then, a total similar vector s is obtained by adding up each column of the similarity degree matrix, where e is a vector whose elements are all 1, and s=Ke. Then, a vector z is obtained by calculation according to a formula $$\min_z \left\| \begin{bmatrix} e^T \\ 0 \end{bmatrix} - \begin{bmatrix} e^T K \\ \sqrt{\alpha} e^T D \end{bmatrix} z \right\|_2^2; \text{ s.t. } 0 \leq z \leq 1,$$

where e is a vector whose elements are all 1, s=Ke, α is a given balance parameter, and D is a given diagonal matrix that includes ranking information of images that are searched for the first time. Finally, a final score for ranking is calculated by using a formula $r_i=\Sigma_{m=1}^M 1_{(z_m>0)} \text{Ker}(p^*_i, p^*_m)$, where $1_{(z_m>0)}$ indicates that when $z_m>0$, $1_{(z_m>0)}$ is equal to 1; otherwise, $1_{(z_m>0)}$ is equal to 0, vector $z_m$ is the $m^{th}$ component of the vector z, $\text{Ker}(p^*_i, p^*_m)$ is a kernel function that is used to calculate similarity between vectors, for example $\text{Ker}(p^*_i, p^*_m)$ may be represented by using an inner product of a vector, or the like, and $p^*_i$ and $p^*_m$ respectively represent a concept projection vector of the $i^{th}$ image after smoothing and a concept projection vector of the $m^{th}$ image after smoothing.

More detailed optional methods can be found in articles such as [N. Morioka and J. Wang. Robust visual reranking via sparsity and ranking constraints. In ACM MM, 2011] and [W. Hsu, L. Kennedy, and S.-F. Chang. Video search reranking through random walk over document-level context graph. In ACM MM, 2007.].

Figure 2A:
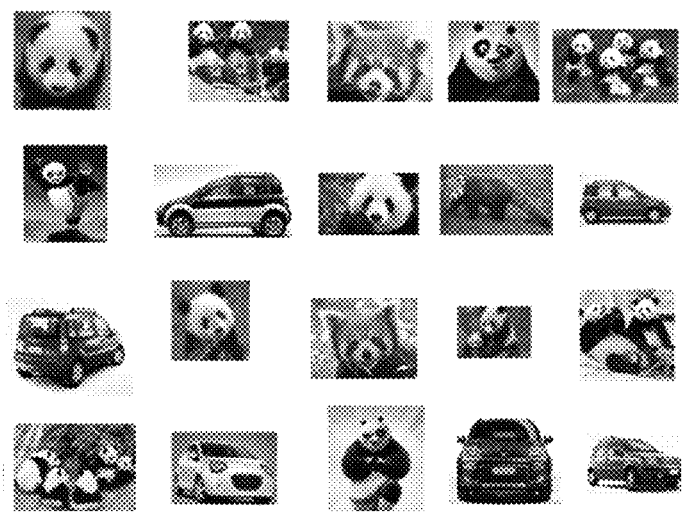
FIG. 2a is a schematic diagram of a search result corresponding to an initial keyword "panda" according to Embodiment 1 of the present disclosure.
Figure 2B:
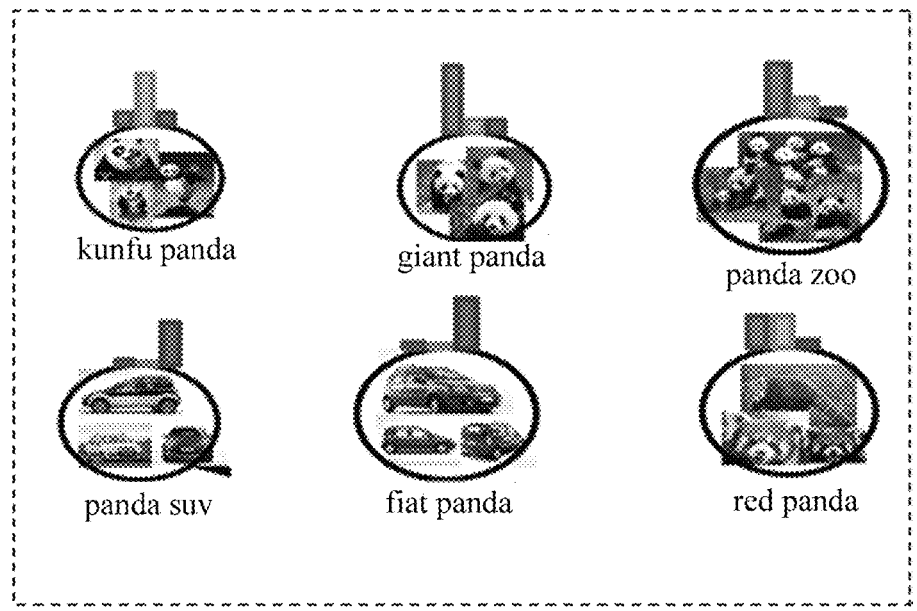

For example, when a user enters an initial keyword "panda" to perform image searching, "panda" is first used as the initial keyword to perform image searching in a search engine, and a search result shown in FIG. 2a is obtained, where the search result includes different types of images, such as an animal panda, a car, and a movie poster. An image visual feature of each image $I_k$ in the search result is extracted, where k=1, 2, 3, . . . , N6, and N6 is a quantity of images in the image set $\Gamma_q$. A similar image set $N(I_k)$ is formed by using K images whose visual features are similar in the search result. Then, words that occur most frequently in text of all web pages that describes images in $N(I_k)$ are counted, and T words that occur most frequently in text related to the similar image set $N(I_k)$ is used as candidate words, to obtain a candidate word set $W_{I_k}$ that is, $W_{I_k}=\{\omega_{I_k}^i\}_{i=1}^T$. Then, a weight of the candidate word $\omega_{I_k}$ is calculated by using a formula $r_f(\omega_{I_k}^i)=r_f(\omega_{I_k}^i)+(T-i)$, where $r_f(\omega_{I_k}^i)$ represents the weight of the candidate word $\omega_{I_k}^i$, and i represents an order of the candidate word $\omega_{I_k}^i$ in the candidate word set $W_{I_k}$. Finally, $M_q$ words whose $r_f(\omega_{I_k}^i)$ is the largest are selected and combined with the initial keyword q to form $M_q$ anchor concepts. As shown in FIG. 2b, altogether six candidate words, including "Kung Fu", "giant", "zoo", "SUV", "fiat", and "red", are obtained. These words are combined with "panda" to obtain candidate set anchor concepts, which are respectively "Kung Fu Panda", "giant panda giant panda", "panda zoo panda zoo", "panda SUV panda SUV", "fiat panda fiat panda", and "red panda red panda".

Figure 2C:
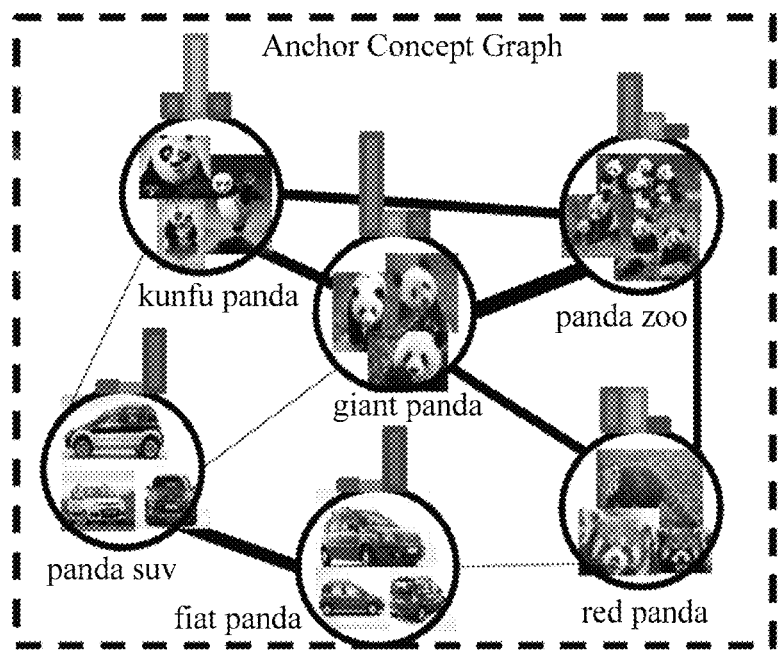
Figure 2D:
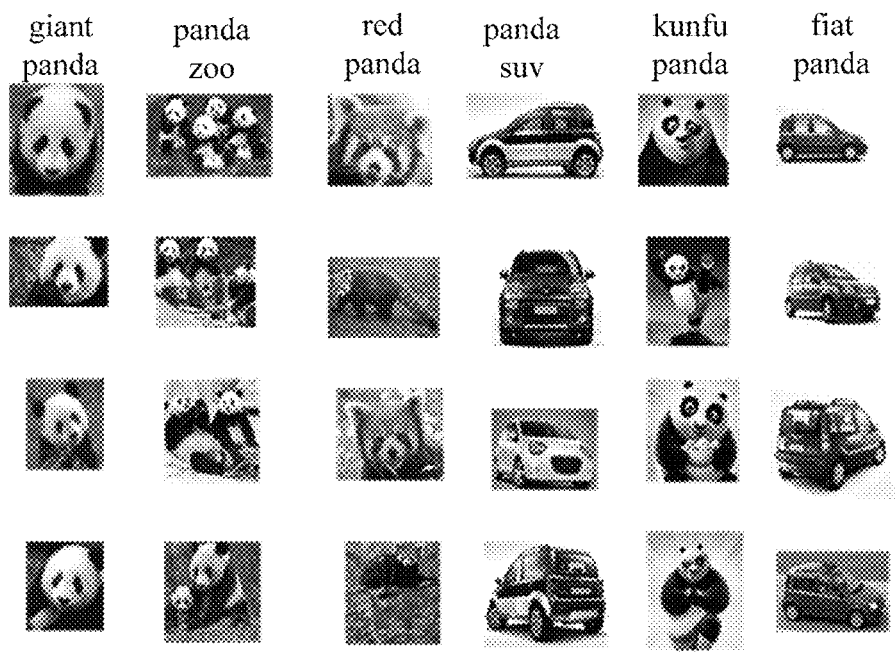
FIG. 2d is a schematic diagram of images in FIG. 2a after re-ranking.

Words that are on a web page and occur in a same document with the anchor concepts are counted, the top N1 words that can most represent semantics of the anchor concepts are found out from the words, a weight is assigned to the top N1 words, and vectors corresponding to the anchor concepts are formed by using the weight of the top N1 words, where N1 is a preset positive integer. A weight of a correlation between the anchor concepts and a correlation weight matrix are obtained by calculating a degree of similarity between the vectors corresponding to the anchor concepts. An anchor concept graph ACG is formed by using the anchor concepts as vertexes and the weight of the correlation between the anchor concepts as a weight of a side between the vertexes. As shown in FIG. 2c, in the ACG, six anchor concepts are vertexes, and weights of correlations between the anchor concepts are weights of sides between the vertexes. Image searching is performed by using the anchor concepts as keywords and by using a search engine again, to obtain a search result of the anchor concepts. Visual features of the top N2 images are extracted, and are used as a positive training sample to train a classifier, to obtain a trained classifier. Concept projection is performed by using the trained classifier and the ACG, that is, a visual feature of an image in the image search result corresponding to the initial keyword "panda" is extracted one by one. Then, a probability that the image belongs to a category to which the anchor concepts in the ACG belong is obtained by performing calculation on the extracted visual feature by using the classifier, and is used as an initial concept projection vector of the image corresponding to the concept projection, to obtain a corresponding concept projection vector after smoothing. A distance between concept projection vectors of any two images (that is, a pair of images) after image smoothing is calculated by using a distance calculation formula, and is used as an ACG distance between the pair of images. Score values of the images for re-ranking are calculated by using the ACG distance between the pair of images, and the images are re-ranked according to the score values for re-ranking, to obtain a re-ranking result shown in FIG. 2d, where the re-ranking result includes six categories, and images in each category are ranked according to the score values for re-ranking.

Optionally, after the ranking, according to the ACG distance, the images in the search result corresponding to the initial keyword, the method further includes: displaying a ranking result of the images in an image logic organizing manner of having a similar vision and similar semantic information.

The image logic organizing manner of having a similar vision and similar semantic information may be in multiple forms, including: displaying together, by using a frame, images that are in the images and belong to a same category to which the anchor concepts belong; for example, images of the same category are surrounded by using a frame, such as an ellipse or a rectangle; or displaying, according to a difference between distance values, images that are in the images and belong to different categories to which the anchor concepts belong; for example, images of different categories may be displayed according to the distance values, instead of using a frame (that is, a distance between an image and an image of a same category is obviously less than a distance between images of different categories); or displaying, by using a hierarchical recursive structure, each type of images that are in the images and belong to a same category to which the anchor concepts belong; for example, a subcategory is recursively represented in a category, that is, the category represented by a large ellipse (or rectangle) has several subcategories represented by small ellipses (or rectangles); or displaying, in a thumbnail cascading manner, images that are in the images and belong to a same category to which the anchor concepts belong.

The most representative and main images in each category of images (that is, several images whose score values are the highest in the category) are displayed in a thumbnail cascading manner. The cascading display manner is used not only to display content of the main images of the category, but also to reduce space of web page displaying, and bring people a sense of beauty that a manner of disposing images in reality is simulated.

After categories of images are displayed, when an area of a category to which the anchor concepts belong is selected, for example, when a mouse or another dynamic input device moves to an area of a category to which one of the anchor concepts belongs, the category is considered a category that a user wants to know, and therefore, more detailed information of the category should be displayed. Images that are in the area in which a cursor is located and are of the category to which the anchor concept belongs are displayed uppermost on a displayed screen, so that a user views all images of the category. Alternatively, when a mouse or another dynamic input device moves to one of the categories, the category is presented in a quasi-activated state; that is, an area occupied by the category is obviously larger than that of another category, and the cascading manner of images included in the category changes slowly. For example, an upper-layer image slowly moves to a lower layer in an animation manner, and a lower-layer image moves to a top layer according to a cascading order, so that a user has an opportunity to view an image previously shielded due to a space limitation.

Alternatively, the anchor concepts are annotated, in a text form, at a periphery of images that are in the images and belong to a same category to which the anchor concepts belong. For example, one (or no) text tag next to images of the same category is used as an advanced semantic concept that identifies the category of images, and the tag is an anchor concept in a text form in this patent.

Alternatively, a value of a correlation between the images and the category to which the anchor concepts belong is represented, in a form of a number or a bar length at a periphery of images that are in the images and belong to a same category to which the anchor concepts belong, where a larger number or a longer bar represents a higher correlation. For example, next to an image or images of the same category, there may be (or may not be) a schematic correlation identifier indicating a degree of association between the image or the images of the same category and each category of images, or the like.

Figure 2E:
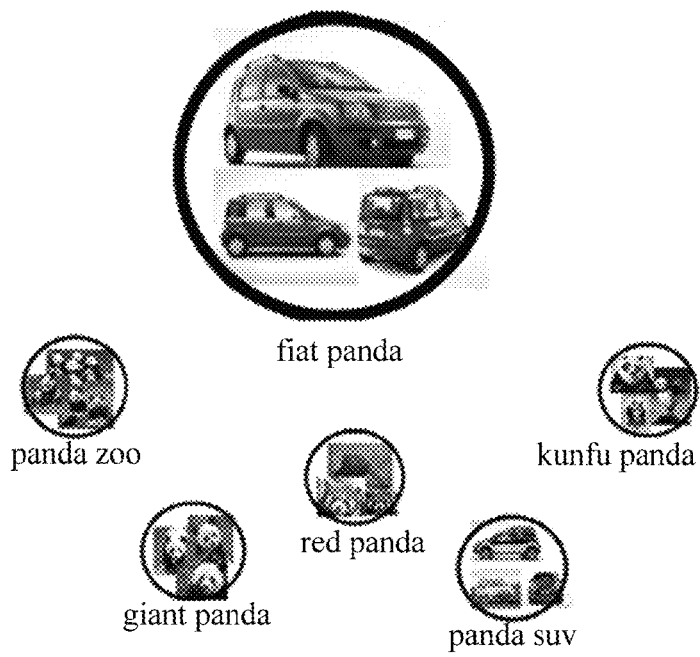
FIG. 2e is a schematic diagram of an index chart of images in FIG. 2a after re-ranking.
Figure 2F:
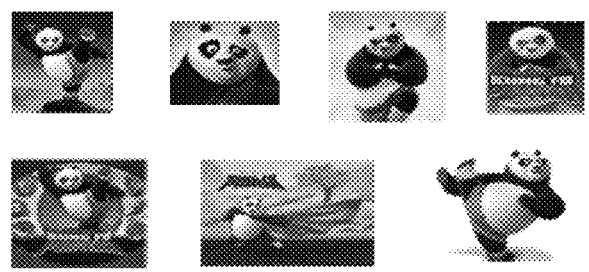
FIG. 2f is a schematic diagram of images of a category of "Kung Fu Panda" in FIG. 2b.

The foregoing initial keyword "panda" is used as an example. In a ranking result, images are disposed at a periphery of an anchor concept to which the images belong, and an index chart after reclassification is formed in a manner of category displaying. As shown in FIG. 2e, a re-ranking result is displayed according to a result of reclassification. After viewing the index chart that is obtained after reclassification and is shown in FIG. 2e, and when clicking one of categories, a user can obtain an image that satisfies an intention of the user, and images of the category are ranked according to score values for re-ranking. For example, when "Kung Fu Panda" is clicked, a result obtained is shown in FIG. 2f. Images of a category to which an anchor concept "kunfu panda" belongs are shown, where the images of the category are displayed according to a ranking of a score value of each image, and images of another category are hidden (or a thumbnail of images of another category are disposed at an unremarkable position).

Certainly, an image retrieval result according to the present disclosure may also be displayed in another manner, which is not limited in the present disclosure.

The foregoing is a detailed description of an image re-ranking method provided in the present disclosure, and the following describes in detail an image re-ranking apparatus provided in the present disclosure.

Embodiment 2

Figure 3:
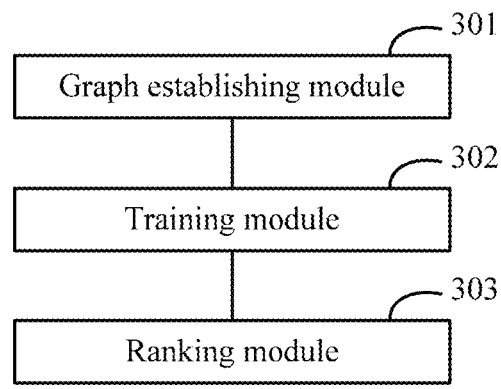
FIG. 3 is a schematic diagram of an image re-ranking apparatus according to Embodiment 2 of the present disclosure.

FIG. 3 is a schematic diagram of an image re-ranking apparatus provided in this embodiment. As shown in FIG. 3, an image re-ranking apparatus provided in the present disclosure includes a graph establishing module 301, a training module 302, and a ranking module 303.

The graph establishing module 301 is configured to: perform image searching by using an initial keyword; obtain, by calculation, an anchor concept set of an initial search result according to the search result corresponding to the initial keyword; obtain, by calculation, a weight of a correlation between anchor concepts in the anchor concept set; and form an anchor concept graph ACG by using the anchor concepts in the anchor concept set as vertexes and the weight of the correlation between the anchor concepts as a weight of a side between the vertexes.

The weight of the correlation between the anchor concepts represents a value of the correlation between the anchor concepts.

The training module 302 is configured to acquire a positive training sample by using the anchor concepts obtained by the graph establishing module 301, and train a classifier by using the positive sample, to obtain a trained classifier.

The ranking module 303 is configured to: perform concept projection by using the ACG formed by the graph establishing module 301 and the trained classifier obtained by the training module 302, to obtain a concept projection vector; calculate, according to the concept projection vector, an ACG distance between images in the search result corresponding to the initial keyword; and rank, according to the ACG distance, the images in the search result corresponding to the initial keyword.

Figure 4:
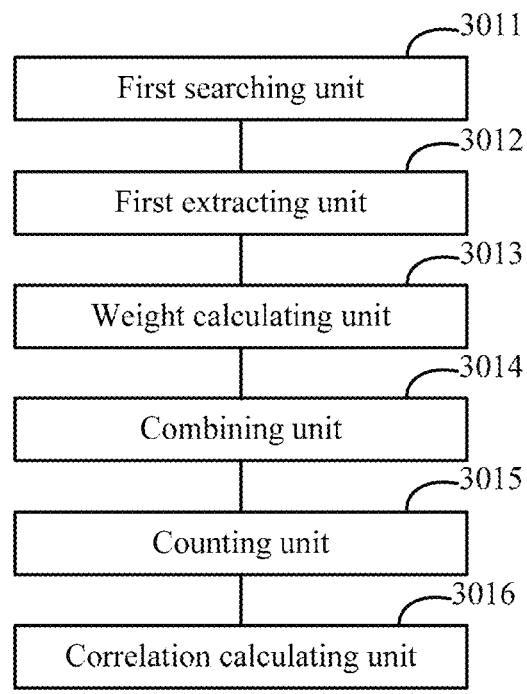
FIG. 4 is a schematic structural diagram of a graph establishing module according to Embodiment 2 of the present disclosure.

FIG. 4 is a schematic structural diagram of the graph establishing module. As shown in FIG. 4, the graph establishing module 301 includes a first searching unit 3011, a first extracting unit 3012, a weight calculating unit 3013, a combining unit 3014, a counting unit 3015, and a correlation calculating unit 3016.

The first searching unit 3011 is configured to perform image searching by using an initial keyword q, to obtain a search result.

The search result includes an image set $\Gamma_q$ of the initial keyword q, and a text set q that surrounds an image in the image set $\Gamma_q$ on a web page.

The first extracting unit 3012 is configured to: extract a visual feature of each image $I_k$ (k=1, 2, . . . ) in the image set $\Gamma_q$ obtained by the first searching unit 3011; form a similar image set $N(I_k)$ of the image $I_k$ by using K images whose visual features are most similar to that of the image $I_k$; and use T words that occur most frequently in text that surrounds all images in the similar image set $N(I_k)$ as candidate words, to obtain a candidate word set $W_{I_k}$ of a meaning of the image $I_k$, that is, $W_{I_k} = \{\omega_{I_k}^i\}_{i=1}^T$. The visual feature may be a feature such as a color, a shape, a texture, or a spatial relationship of an image.

In the formula, $I_k$ represents the $k^{th}$ image in the similar image set $\Gamma_q$, k=1, 2, . . . , N6, N6 is a quantity of images in the image set $\Gamma_q$, $\omega_{I_k}^i$ represents the $i^{th}$ candidate word of the $k^{th}$ image $I_k$, i=1, 2, 3, . . . , T, and T is a preset positive integer.

The weight calculating unit 3013 is configured to perform weight calculation on each candidate word $\omega_{I_k}^i$ in the candidate word set $W_{I_k}$ obtained by the first extracting unit 3012, to obtain a weight of the candidate word $\omega_{I_k}^i$.

The weight calculating unit 3013 calculates the weight $r_f(\omega_{I_k}^i)$ of the candidate word $\omega_{I_k}^i$ according to a value of an occurrence frequency of the candidate word $\omega_{I_k}^i$. A higher occurrence frequency of the candidate word $\omega_{I_k}^i$ indicates a larger weight $r_f(\omega_{I_k}^i)$. For example, after the candidate word set is ranked according to an occurrence frequency of a candidate word in descending order (for example, $\omega_{I_k}^1$ represents a word whose occurrence frequency is the highest, $\omega_{I_k}^2$ represents a word whose occurrence frequency is the second highest . . . ), and a weight of the candidate word $\omega_{I_k}^i$ is calculated by using a formula $r_f(\omega_{I_k}^i)=r_f(\omega_{I_k,l})+(T-i)$, where $r_f(\omega_{I_k}^i)$ represents the weight of the candidate word $\omega_{I_k}^i$, i represents an order of the candidate word $\omega_{I_k}^i$ in the candidate word set $W_{I_k}$. For example, if a candidate word set has five candidate words, that is, T=5, a weight of a candidate word $\omega_{I_k}^i$ whose occurrence frequency is the highest is $r_f(\omega_{I_k}^1)=r_f(\omega_{I_k}^1)+(T-1)=4$, and by analogy, a weight of a candidate word $\omega_{I_k}^2$, whose occurrence frequency is the second highest is 3, and a weight of a candidate word $\omega_{I_k}^2$ whose occurrence frequency is the third highest is 2. Certainly, a term frequency of a candidate word $\omega_{I_k}^i$ after normalization may also be directly used as a weight of the candidate word $\omega_{I_k}^i$, or another weight calculation method may be used.

The combining unit 3014 is configured to separately combine, according to a calculation result of the weight calculating unit 3013, $M_q$ candidate words whose weights $r_f(\omega_{I_k}^i)$ are the largest in the candidate word set $W_{I_k}$ with the initial keyword q, to obtain $M_q$ anchor concepts and form an anchor concept set $C_q$, where:

$M_q$ is a quantity of elements in the anchor concept set $C_q$ corresponding to the preset initial keyword q.

The counting unit 3015 is configured to count words that are on a web page and occur in a same document with the anchor concepts, find out, from the words, the top N1 words that can most represent semantics of the anchor concepts, assign a weight to the top N1 words according to a preset value assignment method, and form, by using the weight of the top N1 words, vectors corresponding to the anchor concepts, where N1 is a preset positive integer.

Optionally, a manner of directly using each anchor concept al to obtain, by searching on a search engine, the top N3 document summaries corresponding to al and counting the most important N1 words in the top N3 document summaries may be used to calculate a vector corresponding to each anchor concept al. A manner of using an anchor concept as a keyword to search a web page on a search engine, or a manner of directly collecting statistics about web page data may also be used, text or a text summary that occurs in a same article as the anchor concept is obtained, the top N4 summaries are combined into one article, a statistics collection method, such as TF-IDF, is used to obtain a vector of the combined article, and then processing such as normalization is performed on the vector to obtain a final vector corresponding to the anchor concept. Then, a degree of similarity between final vectors corresponding to the anchor concepts is calculated, where N1, N3, and N4 are preset positive integers. A more detailed discussion about anchor concept calculation can be found in an article [M. Sahami and T. D. Heilman. A web-based kernel function for measuring the similarity of short text snippets. In WWW, 2006] and a bibliography of the article.

The correlation calculating unit 3016 is configured to calculate a degree of similarity between vectors corresponding to any two of the anchor concepts, and use the degree of similarity as a weight of a correlation between the two corresponding anchor concepts.

Optionally, a cosine distance, a Euclidean distance, or the like of vectors corresponding to any two anchor concepts $C_i$ and $C_j$ may be calculated by the correlation calculating unit 3016 and used as a degree of similarity between the two vectors, that is, a weight of a correlation between the anchor concepts.

Statistics collection and calculation are repeatedly performed by using the counting unit 3015 and the correlation calculating unit 3016, until calculation of weights of correlations between all anchor concepts is completed. The degree of similarity or the weight of the correlation between the anchor concepts $C_i$ and $C_j$ is represented by using $w_{ij}$, and $w_{ij}$ is used as an element in the $i^{th}$ row and the $j^{th}$ column of a matrix W. When $w_{ii}$ (i=1, 2, . . . , $M_q$) is set to 1, the correlation matrix W of an anchor concept of an anchor concept graph ACG can be obtained.

In this way, an anchor concept graph ACG is formed by using the anchor concepts as vertexes and the weight of the correlation between the anchor concepts as a weight of a side.

Figure 5:
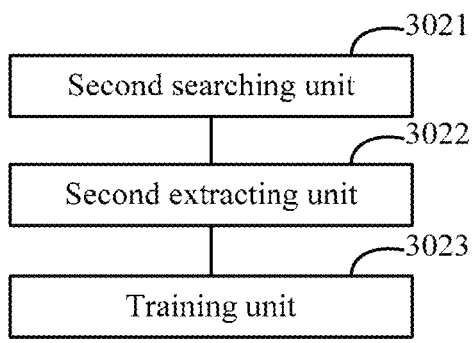
FIG. 5 is a schematic structural diagram of a training module according to Embodiment 2 of the present disclosure.

FIG. 5 is a schematic structural diagram of the training module. As shown in FIG. 5, the training module 302 includes a second searching unit 3021, a second extracting unit 3022, and a training unit 3023.

The second searching unit 3021 is configured to perform image searching or statistics collection again by using the anchor concepts, and train a classifier by using a result obtained by the re-searching or re-collection as a positive training sample, to obtain a trained classifier, which includes: performing image searching or statistics collection by using the anchor concepts as keywords, which may be completed by using an existing search engine or by independently collecting statistics about images on a web page, to obtain search result sets of the anchor concepts (that is, a result obtained by performing searching or statistics collection by using the anchor concepts); and selecting the top N2 images in a search result corresponding to the anchor concept $a_i$ as a positive sample set of the anchor concept $a_i$, where N2 is a preset integer, and i=1, 2, 3, . . . , $M_q$.

The second extracting unit 3022 is configured to extract visual features of the N2 images in the positive sample set that is corresponding to the anchor concept $a_i$ and obtained by the second searching unit 3021, and use the visual features as a feature set of positive samples that is corresponding to the anchor concepts.

The training unit 3023 is configured to train the classifier by using the positive samples that are corresponding to the anchor concepts and obtained by the second extracting unit 3022, to obtain the trained classifier.

Optionally, the training unit 3023 uses an existing multi-class support vector machine (Multi-class Support Vector Machine, Multi-class SVM) or the like as a classifier.

Figure 6:
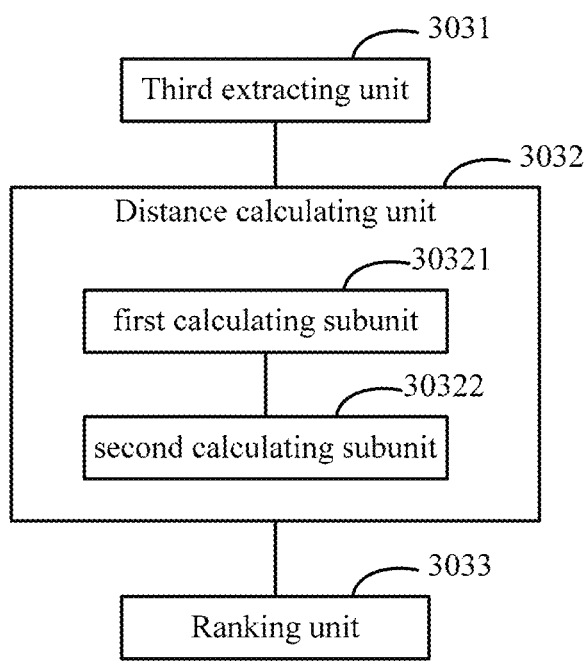
FIG. 6 is a schematic structural diagram of a ranking module according to Embodiment 2 of the present disclosure.

FIG. 6 is a schematic structural diagram of the ranking module. As shown in FIG. 6, the ranking module 303 includes a third extracting unit 3031, a distance calculating unit 3032, and a ranking unit 3033.

The third extracting unit 3031 is configured to: extract a visual feature of an image in the search result corresponding to the initial keyword, calculate, by using the ACG formed by the graph establishing module 301 and the trained classifier obtained by the training module 302, a probability that the extracted visual feature belongs to a category to which each of the anchor concepts belong, and use the probability as an initial concept projection vector of an image corresponding to the concept projection.

The distance calculating unit 3032 is configured to calculate, according to the initial concept projection vector, the ACG distance between the images in the search result corresponding to the initial keyword obtained by the third extracting unit 3031, and includes a first calculating subunit 30321 and a second calculating subunit 30322.

The first calculating subunit 30321 is configured to perform, by using a formula $$p_i^* = \sum_{n=0}^{\infty} (\alpha^n \overline{W} p_i) = (I - \alpha \overline{W})^{-1} p_i,$$

smoothing processing on an initial concept projection vector $p_i$ of an image corresponding to the initial keyword q.

In the formula, $p_i$ represents an initial concept projection vector of the $i^{th}$ image corresponding to the initial keyword q, $p^*_i$ represents the $i^{th}$ concept projection vector after smoothing, α represents a damping factor that controls a diffusion rate, $\overline{W}$ represents a column-normalized correlation matrix, $\overline{W}=WD^{-1}$, D is a diagonal matrix of a diagonal element $D_{ii}=\Sigma_{j=1}^{M_q} W_{ji}$, and $M_q$ is the quantity of the elements in the anchor concept set $C_q$ corresponding to the preset initial keyword q.

Smoothing processing is readjusting values of components of the initial concept projection vector $p_i$ according to a correlation relationship between the components of the initial concept projection vector $p_i$ of an original image, so that in a projection vector corresponding to an image, a value of a component of a category corresponding to a more similar visual feature is larger. A result of the smoothing processing enables final ACG distance calculation to be capable of more accurately differentiating between categories of images in high-level semantics.

The second calculating subunit 30322 is configured to calculate an ACG distance $dist^{ACG}$ between the $i^{th}$ image and the $j^{th}$ image by using a formula $dist^{ACG}=\|p^*_i-p^*_j\|_1=\|(I-\alpha \overline{W})^{-1}(p_i-p_j)\|_1$.

The ranking unit 3033 is configured to perform re-ranking on the images according to the ACG distance obtained by the distance calculating unit 3032 by calculation.

The ranking unit 3033 calculates, according to the ACG distance, score values of the images for re-ranking, and performs re-ranking on the images. Optionally, the ranking unit 3033 calculates a distance between any two images in an initial search result by using the ACG distance, thereby obtaining a similarity degree matrix K of the images, where an element $k_{ij}$ of the matrix K represents the $i^{th}$ image and the $j^{th}$ image in the search result corresponding to the initial keyword. Then, the ranking unit 3033 obtains a total similar vector s by adding up each column of the similarity degree matrix, where e is a vector whose elements are all 1, and s=Ke. Then, the ranking unit 3033 obtains a vector z by calculation according to a formula $$\min_z \left\| \begin{bmatrix} e^T \\ 0 \end{bmatrix} - \begin{bmatrix} e^T K \\ \sqrt{\alpha}\, e^T D \end{bmatrix} z \right\|_2^2; \text{ s.t. } 0 \le z \le 1,$$

where e is a vector whose elements are all 1, S=Ke, $\alpha$ is a given balance parameter, and D is a given diagonal matrix that includes ranking information of images that are searched for the first time. Finally, the ranking unit 3033 calculates a final score for ranking by using a formula $r_i = \Sigma_{m=1}^{M} 1_{(z_m>0)} \text{Ker}(p^*_i, p^*_m)$, where $1_{(z_m>0)}$ indicates that when $z_m>0$, is equal to 1; otherwise, $1_{(z_m>0)}$, is equal to 0, vector $z_m$ is the $m^{th}$ component of the vector z, $\text{Ker}(p^*_i, p^*_m)$ is a kernel function that is used to calculate similarity between vectors, for example, $\text{Ker}(p^*_i, p^*_m)$ may be represented by using an inner product of a vector, or the like, and $p^*_i$ and $p^*_m$ respectively represent a concept projection vector of the $i^{th}$ image after smoothing and a concept projection vector of the $m^{th}$ image after smoothing.

More detailed optional methods can be found in articles such as [N. Morioka and J. Wang. Robust visual reranking via sparsity and ranking constraints. In ACM MM, 2011] and [W. Hsu, L. Kennedy, and S.-F. Chang. Video search reranking through random walk over document-level context graph. In ACM MM, 2007.].

Optionally, the image re-ranking apparatus provided in the present disclosure further includes a displaying module (not shown in the drawings), which is configured to display, in an image logic organizing manner of having a similar vision and similar semantic information, a ranking result of the images that is obtained by the ranking module 303.

The image logic organizing manner of having a similar vision and similar semantic information may be in multiple forms, including: displaying together, by using a frame, images that are in the images and belong to a same category to which the anchor concepts belong; for example, images of the same category are surrounded by using a frame, such as an ellipse or a rectangle; or displaying, according to a difference between distance values, images that are in the images and belong to different categories to which the anchor concepts belong; for example, images of different categories may be displayed according to the distance values, instead of using a frame (that is, a distance between an image and an image of a same category is obviously less than a distance between images of different categories); or displaying, by using a hierarchical recursive structure, each type of images that are in the images and belong to a same category to which the anchor concepts belong; for example, a subcategory is recursively represented in a category, that is, the category represented by a large ellipse (or rectangle) has several subcategories represented by small ellipses (or rectangles); or displaying, in a thumbnail cascading manner, images that are in the images and belong to a same category to which the anchor concepts belong.

The most representative and main images in each category of images (that is, several images whose score values are the highest in the category) are displayed in a thumbnail cascading manner. The cascading display manner is used not only to display content of the main images of the category, but also to reduce space of web page displaying, and bring people a sense of beauty that a manner of disposing images in reality is simulated.

After categories of images are displayed, when an area of a category to which the anchor concepts belong is selected, for example, when a mouse or another dynamic input device moves to an area of a category to which one of the anchor concepts belongs, the category is considered a category that a user wants to know, and therefore, more detailed information of the category should be displayed. Images that are in the area in which a cursor is located and are of the category to which the anchor concept belongs are displayed uppermost on a displayed screen, so that a user views all images of the category. Alternatively, when a mouse or another dynamic input device moves to one of the categories, the category is presented in a quasi-activated state; that is, an area occupied by the category is obviously larger than that of another category, and the cascading manner of images included in the category changes slowly. For example, an upper-layer image slowly moves to a lower layer in an animation manner, and a lower-layer image moves to a top layer according to a cascading order, so that a user has an opportunity to view an image previously shielded due to a space limitation.

The anchor concepts are annotated, in a text form, at a periphery of images that are in the images and belong to a same category to which the anchor concepts belong. For example, one (or no) text tag next to images of the same category is used as an advanced semantic concept that identifies the category of images, and the tag is an anchor concept in a text form in this patent.

Alternatively, a value of a correlation between the images and the category to which the anchor concepts belong is represented, in a form of a number or a bar length at a periphery of images that are in the images and belong to a same category to which the anchor concepts belong, where a larger number or a longer bar represents a higher correlation. For example, next to an image or images of the same category, there may be (or may not be) a schematic correlation identifier indicating a degree of association between the image or the images of the same category and each category of images, or the like.

The foregoing initial keyword "panda" is used as an example. In a ranking result, images are disposed at a periphery of an anchor concept to which the images belong, and an index chart after reclassification is formed in a manner of category displaying. As shown in FIG. 2e, a re-ranking result is displayed according to a result of reclassification. After viewing the index chart that is obtained after reclassification and is shown in FIG. 2e, and when clicking one of categories, a user can obtain an image that satisfies an intention of the user, and images of the category are ranked according to score values for re-ranking. For example, when "Kung Fu Panda" is clicked, a result obtained is shown in FIG. 2f. Images of a category to which an anchor concept "Kung Fu Panda" belongs are shown, where the images of the category are displayed according to a ranking of a score value of each image, and images of another category are hidden (or a thumbnail of images of another category are disposed at an unremarkable position).

Certainly, an image retrieval result according to the present disclosure may also be displayed in another manner, which is not limited in the present disclosure.

According to the image re-ranking method and apparatus provided in the present disclosure, visual feature information of an image is extracted to obtain a high-level text semantic concept (that is, an anchor concept), and an ACG is established. The anchor concept is used as a keyword to acquire training data, and a classifier is trained by using the positive training sample, to obtain a trained classifier obtained by training. An ACG distance is obtained by using the trained classifier and the ACG, and is used as a measurement scale required by image re-ranking, and re-ranking is performed according to the ACG distance. A semantic correlation between training data that is in each category and obtained in the present disclosure is extremely high, a cost of acquiring the training data is lower, and the ACG distance related to the high-level semantic concept is used as the measurement scale of re-ranking, so that ranking of an image search result is more accurate and better satisfies a search intention of a user.

During an implementation process, the steps in the foregoing methods may be completed by using an integrated logic circuit of hardware in the processor or an instruction in a form of software. Steps of the methods disclosed with reference to the embodiments of the present disclosure may be directly executed and accomplished by means of a hardware processor, or may be executed and completed by using a combination of hardware and software modules in the processor. The software module may be located in a mature storage medium in the field, such as a random access memory, a flash memory, a read-only memory, a programmable read-only memory, an electrically-erasable programmable memory, or a register.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

Steps of methods or algorithms described in the embodiments disclosed in this specification may be implemented by hardware, a software module executed by a processor, or a combination thereof. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementation manners, the objective, technical solutions, and benefits of the present disclosure are further described in detail. It should be understood that the foregoing descriptions are merely specific implementation manners of the present disclosure, but are not intended to limit the protection scope of the present disclosure. Any modification, equivalent replacement, or improvement made without departing from the spirit and principle of the present disclosure should fall within the protection scope of the present disclosure.

What is claimed is:

1. An image re-ranking method comprising:
performing image searching by using an initial keyword;
obtaining, by calculation, an anchor concept set of a search result according to the search result corresponding to the initial keyword;
obtaining, by calculation, a weight of a correlation between anchor concepts in the anchor concept set;
forming an anchor concept graph (ACG) by using the anchor concepts in the anchor concept set as vertexes and a line between the vertexes as a side of the vertexes, wherein the side of the vertexes has the weight of the correlation between the anchor concepts, and the weight of the correlation between the anchor concepts represents a value of a semantic correlation between the anchor concepts;
acquiring a positive training sample by using the anchor concepts, and training a classifier by using the positive training sample, to obtain a trained classifier;
performing concept projection by using the ACG and the trained classifier to obtain a concept projection vector;
calculating, according to the concept projection vector, an ACG distance between images in the search result corresponding to the initial keyword; and
ranking, according to the ACG distance, the images in the search result corresponding to the initial keyword.

2. The method according to claim 1, wherein the obtaining, by calculation, an anchor concept set according to the search result corresponding to the initial keyword comprises:
performing image searching by using an initial keyword q, to obtain a search result, wherein the search result comprises an image set $\Gamma_q$ corresponding to the initial keyword q, and a text set $T_q$ that surrounds an image in the image set $\Gamma_q$;
extracting a visual feature of each image in the image set $\Gamma_q$;
for an image $I_k$ in the image set $\Gamma_q$, forming a similar image set $N(I_k)$ of the image $I_k$ by using K images whose visual features are most similar to that of the image $I_k$, and using T words that occur most frequently in text that surrounds all images in the similar image set $N(I_k)$ as candidate words, to obtain a candidate word set $W_{I_k}$ of a meaning of the image $I_k$, that is, $W_{I_k} = \{\omega_{I_k}^i\}_{i=1}^T$, wherein $I_k$ represents the $k^{th}$ image in the image set $\Gamma_q$, k=1, 2, 3, . . . , N6, N6 is a quantity of images in the image set $\Gamma_q$, $\omega_{I_k}^i$ represents the $i^{th}$ candidate word of the image $I_k$, i=1, 2, 3, . . . , T, and T is a preset positive integer;
performing weight calculation on each candidate word $\omega_{I_k}^i$ in the candidate word set $W_{I_k}$ to obtain a weight $r_f(\omega_{I_k}^i)$ of the candidate word $\omega_{I_k}^i$; and
separately combining $M_q$ candidate words whose weights $r_f(\omega_{I_k}^i)$ are the largest in the candidate word set $W_{I_k}$ with the initial keyword q, to obtain $M_q$ anchor concepts and form an anchor concept set $C_q$, wherein $M_q$ is a quantity of elements in the anchor concept set $C_q$ corresponding to the preset initial keyword q.

3. The method according to claim 2, wherein the performing weight calculation on each candidate word $\omega_{I_k}^i$ in the candidate word set $W_{I_k}$ to obtain a weight $r_f(\omega_{I_k}^i)$ of the candidate word $\omega_{I_k}^i$ comprises:
calculating the weight $r_f(\omega_{I_k}^i)$ of the candidate word $\omega_{I_k}^i$ according to a value of an occurrence frequency of the candidate word $\omega_{I_k}^i$, wherein a higher occurrence frequency of the candidate word $\omega_{I_k}^i$ indicates a larger weight $r_f(\omega_{I_k}^i)$.

4. The method according to claim 1, wherein obtaining the weight of the correlation between anchor concepts in the anchor concept set comprises:
counting words that are on a web page and occur in a same document with the anchor concepts, finding out, from the words, the top N1 words that can most represent semantics of the anchor concepts, assigning a weight to the top N1 words according to a preset value assignment method, and forming, by using the weight of the top N1 words, vectors corresponding to the anchor concepts, wherein N1 is a preset positive integer; and calculating a degree of similarity between vectors corresponding to any two of the anchor concepts, and using the degree of similarity as a weight of a correlation between the two corresponding anchor concepts.

5. The method according to claim 1, wherein the acquiring a positive training sample by using the anchor concepts, and training a classifier by using the positive training sample, to obtain a trained classifier comprises:

performing image searching or statistics collection by using the anchor concepts as keywords, to obtain search result sets of the anchor concepts; and selecting the top N2 images in a search result set corresponding to an anchor concept $a_i$ as a positive sample set corresponding to the anchor concept $a_i$, wherein N2 is a preset integer, and i=1, 2, 3, ..., $M_a$;

extracting visual features of the N2 images in the positive sample set corresponding to the anchor concept $a_i$, and using the visual features as a feature set of positive samples that is corresponding to the anchor concepts, wherein N2 is a preset integer, and l=1, 2, 3, ..., $M_a$; and training the classifier by using the feature set of the positive samples that is corresponding to the anchor concepts, to obtain the trained classifier.

6. The method according to claim 1, wherein performing concept projection by using the ACG and the trained classifier to obtain the concept projection vector, and calculating, according to the concept projection vector, the ACG distance between images in the search result corresponding to the initial keyword comprises:

extracting a visual feature of an image in the search result corresponding to the initial keyword, calculating, by using the ACG and the trained classifier, a probability that the extracted visual feature belongs to a category to which each of the anchor concepts belongs, and using the probability as an initial concept projection vector of an image corresponding to the concept projection; and calculating, according to the initial concept projection vector, the ACG distance between the images in the search result corresponding to the initial keyword.

7. The method according to claim 6, wherein calculating, according to the initial concept projection vector, the ACG distance between the images in the search result corresponding to the initial keyword comprises:

performing, by using a formula $$p_i^* = \sum_{n=0}^{\infty} (\alpha^n \overline{W} p_i) = (I - \alpha \overline{W})^{-1} p_i,$$

smoothing processing on an image initial concept projection vector $p_i$ of an image corresponding to the initial keyword, wherein $p_i$ represents an initial concept projection vector of the $i^{th}$ image corresponding to the initial keyword, $p^*_i$ represents the $i^{th}$ concept projection vector after smoothing, $\alpha$ represents a damping factor that controls a diffusion rate, $\overline{W}$ represents a column-normalized correlation matrix, $\overline{W}=WD^{-1}$, D is a diagonal matrix of a diagonal element $D_{ii}=\Sigma_{j=1}^{M_q}W_{ji}$, and $M_q$ is the quantity of the elements in the anchor concept set $C_q$ corresponding to the preset initial keyword q; and calculating an ACG distance $dist^{ACG}$ between the $i^{th}$ image and the $j^{th}$ image by using a formula $dist^{ACG}=\|p^*_i-p^*_j\|_1=\|(I-\alpha\overline{W})^{-1}(p_i-p_j)\|_1$.

8. The method according to claim 1, further comprising: displaying a ranking result of the images in an image logic organizing manner having similar visual characteristics and similar semantic information.

9. The method according to claim 8, wherein the image logic organizing manner having similar visual characteristics and similar semantic information comprises one selected from the group consisting of:

displaying together, by using a frame, images that belong to a same category to which the anchor concepts belong;

displaying, according to a difference between distance values, images that belong to different categories to which the anchor concepts belong;

displaying, by using a hierarchical recursive structure, each type of image that belongs to a same category to which the anchor concepts belong;

displaying, in a thumbnail cascading manner, images that belong to a same category to which the anchor concepts belong;

annotating, in a text form, the anchor concepts at a periphery of images that belong to a same category to which the anchor concepts belong; and representing, in a form of a number or a bar length at a periphery of images that belong to a same category to which the anchor concepts belong, a value of a correlation between the images and the category to which the anchor concepts belong, wherein a larger number or a longer bar represents a higher correlation.

10. The method according to claim 9, wherein displaying in the thumbnail cascading manner, comprises:

displaying the images of the same category to which the anchor concepts belong on an uppermost area on a display screen.

11. An image re-ranking apparatus comprising a non-transitory computer readable medium with stored instructions and a a processor configured to:

perform image searching by using an initial keyword;

obtain, by calculation, an anchor concept set of a search result according to the search result corresponding to the initial keyword;

obtain, by calculation, a weight of a correlation between anchor concepts in the anchor concept set;

form an anchor concept graph (ACG) by using the anchor concepts in the anchor concept set as vertexes and a line between the vertexes as a side of the vertexes, wherein the side of the vertexes has the weight of the correlation between the anchor concepts, and the weight of the correlation between the anchor concepts represents a value of a semantic correlation between the anchor concepts;

acquire a positive training sample by using the anchor concepts, and training a classifier by using the positive training sample, to obtain a trained classifier;

perform concept projection by using the ACG and the trained classifier, to obtain a concept projection vector;

calculate, according to the concept projection vector, an ACG distance between images in the search result corresponding to the initial keyword; and rank, according to the ACG distance, the images in the search result corresponding to the initial keyword.

12. The apparatus according to claim 11, wherein when obtaining, by calculation, the anchor concept set the processor is configured to:

perform image searching by using an initial keyword q, to obtain a search result, wherein the search result comprises an image set $\Gamma_q$ corresponding to the initial keyword q, and a text set $\Gamma_q$ that surrounds an image in the image set $\Gamma_q$;

extract a visual feature of each image in the image set $\Gamma_q$;

for an image $I_k$ in the image set $\Gamma_q$, form a similar image set $N(I_k)$ of the image $I_k$ by using K images whose visual features are most similar to that of the image $I_k$; and use T words that occur most frequently in text that surrounds all images in the similar image set $N(I_k)$ as candidate words, to obtain a candidate word set $W_{I_k}$ of a meaning of the image $I_k$, that is, $W_{I_k} = \{\omega_{I_k}^i\}_{i=1}^T$, wherein $I_k$ represents the $k^{th}$ image in the image set $\Gamma_q$, k=1, 2, 3, ..., N6, N6 is a quantity of images in the image set $\Gamma_q$, $\omega_{I_k}^i$ represents the $i^{th}$ candidate word of the image $I_k$, i=1, 2, 3, ..., T, and T is a preset positive integer;

perform weight calculation on each candidate word $\omega_{I_k}^i$ in the candidate word set $\omega_{I_k}$ to obtain a weight $r_I(\omega_{I_k}^i)$ of the candidate word $\omega_{I_k}^i$; and separately combine $M_q$ candidate words whose weights $r_I(\omega_{I_k}^i)$ are the largest in the candidate word set $W_{I_k}$ with the initial keyword q, to obtain $M_q$ anchor concepts and form an anchor concept set $C_q$, wherein q, wherein $M_q$ is a quantity of elements in the anchor concept set $C_q$ corresponding to the preset initial keyword q.

13. The apparatus according to claim 12, wherein the processor calculates the weight $r_I(\omega_{I_k}^i)$ of the candidate word according to an occurrence frequency of the candidate word $\omega_{I_k}^i$, wherein a higher occurrence frequency of the candidate word $\omega_{I_k}^i$ indicates a larger weight $r_I(\omega_{I_k}^i)$.

14. The apparatus according to claim 11, wherein when obtaining, by calculation, the weight of the correlation between anchor concepts in the anchor concept set, the processor is configured to:

count words that are on a web page and occur in a same document with the anchor concepts, find out, from the words, the top N1 words that can most represent semantics of the anchor concepts, assign a weight to the top N1 words according to a preset value assignment method, and form, by using the weight of the top N1 words, vectors corresponding to the anchor concepts, wherein N1 is a preset positive integer; and calculate a degree of similarity between vectors corresponding to any two of the anchor concepts, and use the degree of similarity as a weight of a correlation between the two corresponding anchor concepts.

15. The apparatus according to claim 11, wherein the processor is further configured to:

perform image searching by using the anchor concepts as keywords, to obtain search result sets of the anchor concepts, and select the top N2 images in a search result set corresponding to an anchor concept $a_i$ as a positive sample set corresponding to the anchor concept $a_i$, wherein N2 is a preset integer, and i=1, 2, 3, ..., $M_q$;

extract visual features of the N2 images in the positive sample set corresponding to the anchor concept $a_i$, and use the visual features as a feature set of positive samples that is corresponding to the anchor concepts, wherein N2 is a preset integer, and i-1, 2, 3, ..., $M_q$; and train the classifier by using the feature set of the positive samples that is corresponding to the anchor concepts, to obtain the trained classifier.

16. The apparatus according to claim 11, wherein the processor is further configured to:

extract a visual feature of an image in the search result corresponding to the initial keyword, calculate, by using the ACG and the trained classifier, a probability that the extracted visual feature belongs to a category to which each of the anchor concepts belongs, and use the probability as an initial concept projection vector of an image corresponding to the concept projection; and calculate, according to the initial concept projection vector, the ACG distance between the images in the search result corresponding to the initial keyword.

17. The apparatus according to claim 16, wherein the processor is further configured to:

perform, by using a formula $$p_i^* = \sum_{n=0}^{\infty} (\alpha^n \overline{W} p_i) = (I - \alpha \overline{W})^{-1} p_i,$$

smoothing processing on an initial concept projection vector $p_i$ of the image, wherein $p_i$ represents an initial concept projection vector of the $i^{th}$ image, $p^*_i$ represents the $i^{th}$ concept projection vector corresponding to the initial keyword q after smoothing, $\alpha$ represents a damping factor that controls a diffusion rate, $\overline{W}$ represents a column-normalized correlation matrix, $\overline{W} = WD^{-1}$, D is a diagonal matrix of a diagonal element $D_{ii} = \sum_{j=1}^{M_q} W_{ji}$, and $M_q$ is the quantity of the elements in the anchor concept set $C_q$ corresponding to the preset initial keyword q; and calculate an ACG distance $dist^{ACG}$ between the $i^{th}$ image and the image by using a formula $dist^{ACG} = \|p^*_i - p^*_j\|_1 = \|(I - \alpha \overline{W})^{-1}(p_i - p_j)\|_1$.

18. The apparatus according to claim 14, further comprising a display screen configured to:

display, in an image logic organizing manner having similar visual characteristics and similar semantic information, a ranking result of the images that is obtained by the ranking module.

19. The apparatus according to claim 18, wherein the image logic organizing manner having similar visual characteristics and similar semantic information comprises one selected from the group consisting of:

displaying together, by using a frame, images that belong to a same category to which the anchor concepts belong;

displaying, according to a difference between distance values, images that belong to different categories to which the anchor concepts belong;

displaying, by using a hierarchical recursive structure, each type of image that belongs to a same category to which the anchor concepts belong;

displaying, in a thumbnail cascading manner, images that belong to a same category to which the anchor concepts belong;

annotating, in a text form, the anchor concepts at a periphery of images that belong to a same category to which the anchor concepts belong; and representing, in a form of a number or a bar length at a periphery of images that belong to a same category to which the anchor concepts belong, a value of a correlation between the images and the category to which the anchor concepts belong, wherein a larger number or a longer bar represents a higher correlation.

20. The apparatus according to claim 19, wherein displaying in the thumbnail cascading manner comprises:
    displaying the images of the same category to which the anchor concepts belong on an uppermost area on the display screen.

* * * * *

UNITED STATES PATENT AND TRADEMARK OFFICE
CERTIFICATE OF CORRECTION

PATENT NO. : 10,521,469 B2
APPLICATION NO. : 15/094675
DATED : December 31, 2019
INVENTOR(S) : Qiu et al.

Page 1 of 1

It is certified that error appears in the above-identified patent and that said Letters Patent is hereby corrected as shown below:

In the Claims

Claim 5, Column 23, Line 24: "1 = 1" should read -- $i = 1$ --.

Claim 11, Column 24, Line 40: "and a a processor" should read -- and a processor --.

Claim 12, Column 24, Line 66: "set the" should read -- set, the --.

Claim 12, Column 25, Line 21: "set $\omega_{I_k}$" should read -- set $W_{I_k}$ --.

Claim 12, Column 25, Line 26: "$C_q$, wherein q, wherein $M_q$" should read -- $C_q$, wherein $M_q$ --.

Claim 13, Column 25, Line 30: "word according" should read -- word $\omega^i_{I_k}$ according --.

Claim 15, Column 25, Line 63: "i-1" should read -- $i=1$ --.

Claim 17, Column 26, Line 35: "and the image" should read -- and the $j^{th}$ image --.

Claim 18, Column 26, Line 37: "claim 14" should read -- claim 11 --.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*